June 5, 1951   E. P. COSNER   2,555,396
FEED RECEPTACLE FOR DOGS AND CATS
Filed June 4, 1948   2 Sheets-Sheet 1

Inventor
Ernest P. Cosner

By Patrick D. Beavers
Attorney

June 5, 1951 E. P. COSNER 2,555,396
FEED RECEPTACLE FOR DOGS AND CATS
Filed June 4, 1948 2 Sheets-Sheet 2
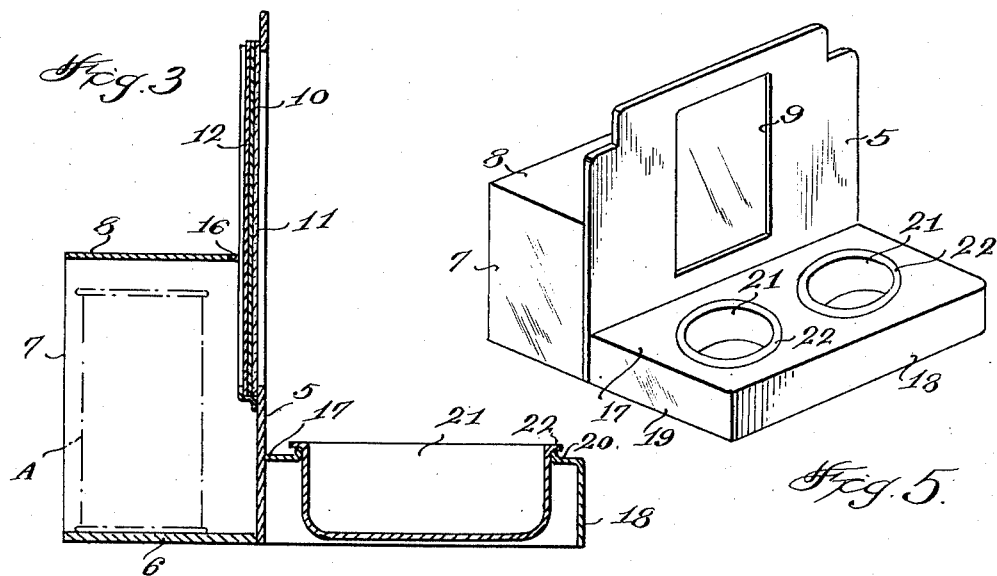
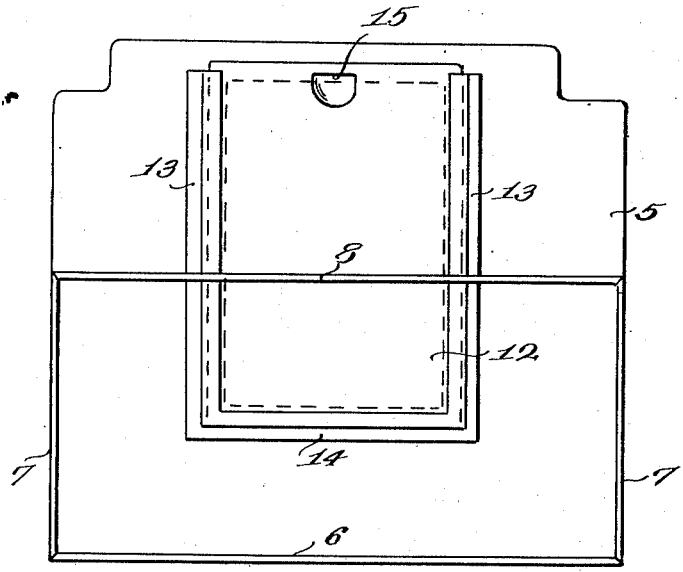
Inventor
Ernest P. Cosner
By Patrick D. Beavers
Attorney Patented June 5, 1951

2,555,396

UNITED STATES PATENT OFFICE 2,555,396

FEED RECEPTACLE FOR DOGS AND CATS

Ernest P. Cosner, Laramie, Wyo.

Application June 4, 1948, Serial No. 31,161

1 Claim. (Cl. 119—51.5)

The present invention relates to improvements in feeding appliances especially adapted for household pets, such as dogs and cats.

The principal object of the present invention is to provide a feeding station for such animals as dogs and cats incorporating receptacles for food and drink as well as other adjuncts incident to the maintenance of such animals.

Another object of the invention is to provide a pet feeding station or outfit which includes many of the necessities incident to raising pets, thus confining in one ensemble factors which heretofore are usually scattered about a household and in the instance of canned food, water and food receptacle and other appliances, frequently become misplaced or lost.

A further object of the invention is to provide a structure of the character stated which can be readily cleaned and maintained conveniently, with still the further object of affording such a device requiring but a very limited supporting surface area.

These and various other objects and advantages of the invention will become apparent to the reader of the following description.

In the drawings:

Figure 3 is a vertical sectional view taken substantially on line 3—3 of Figure 1.

Figure 4 is a rear elevational view of the station.

Figure 5 is a perspective view of the structure.

Figure 1:
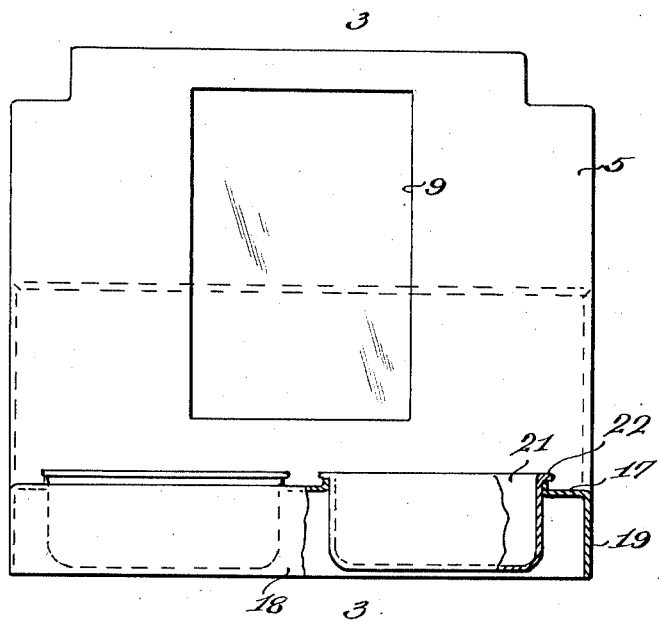
Figure 1 is a front elevational view of the station with a portion in section.

Referring to the drawings, wherein like numerals designate like parts, numeral 5 denotes a vertical wall from the rear of which projects a canned food compartment consisting of a bottom wall 6, side walls 7 and a top wall 8. The wall 5 has a rectangular shaped opening 9 therein and through which a photograph or other picture 10 of the particular pet or some other subject is visible, this photograph or picture 10 being provided with a transparent front pane 11 and a stiff backing plate 12.

Figure 2:
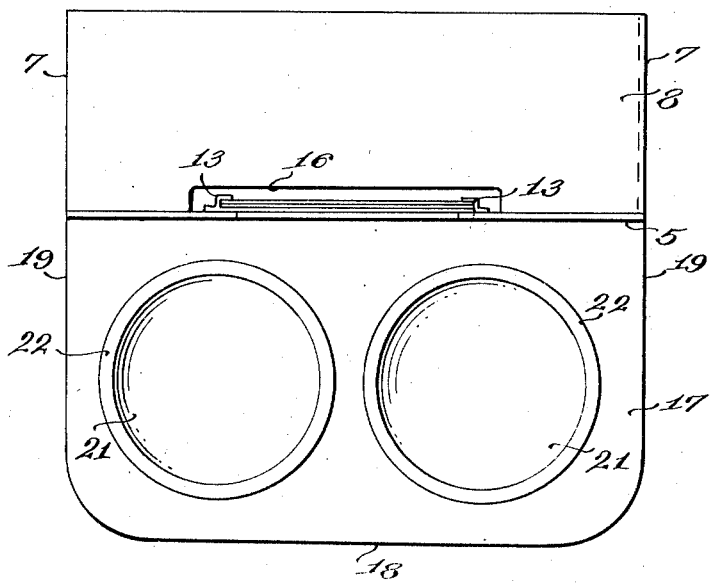
Figure 2 is a top plan view of the structure.

Horizontally spaced and vertically disposed guide members 13, 13 are suitably secured to the rear side of the vertical wall 5 and these are connected by similarly formed pieces 14 bridging the lower ends thereof, as shown in Figure 4. If desired, the backing 12 may be in the form of a frame for carrying the photograph or picture 10 and it is preferable that the rear sides thereof at the upper edge be formed with a fingernail receiving groove 15 to facilitate removal of the backing 12 from the guide 13. As is clearly illustrated in Figures 3 and 2, the forward edge of the top wall 8 of the canned food compartment is cut away, as at 16 to accommodate the guide 13 and the picture assembly.

Projecting forwardly from the vertical wall 5 and below the picture opening 9 is a receptacle supporting horizontal wall 17 having at least a pair of circular openings therein and this horizontal wall 17 has a depending front skirt 18 and side skirts 19 which terminate at their lower edges on the same plane as the bottom 6 of the canned food compartment.

The horizontal plate 17 has an annular lip rising therefrom at each circular opening to provide a riser for a corresponding receptacle or tray 21, each receptacle 21 being provided with an outstanding circumferential flange 22 for rest on the underlying lip 20. As can be seen in Figure 3, the receptacle 21 is of a depth less than the distance from the top of the lip 20 to lower edge of the skirt 18, 19, to the end that the bottom of the receptacle will be slightly above the lowermost plane of the ensemble. Obviously, the receptacles 21 can be easily removed for the purpose of filling or the cleaning thereof. One receptacle can be used for water or milk and the other for a solid food.

Cans A of pet food can be disposed into the compartment and upon the bottom 6 where it is within handy reach at all times.

With the provision of the photograph, especially of the particular pet, a personalized aspect is afforded.

Furthermore, the structure is compact and requires very limited space. By having the receptacles supported from the horizontal plate 17 there is less chance of food, milk or other substance being displaced onto the floor or other surface upon which the station rests.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A device of the character described comprising a storage container having a forward vertically extending wall, a top, a bottom and sides, a horizontally extending plate extending forwardly from said forward wall of the container in spaced relation to the bottom edge thereof, said plate having a plurality of openings therein, an upwardly extending bead formed in said plate at the edge of each of said openings, a tray for each of said openings, said trays each provided with an outwardly extending flange adapted to rest on one of said beads, and dependent integrally formed skirts at the front and sides of said plate, said skirts having their lower edges in the same plane as the bottom of said container.

ERNEST P. COSNER.

REFERENCES CITED

The following references are of record in the file of this patent:

UNITED STATES PATENTS

| Number | Name | Date |
|---|---|---|
| D. 105,450 | Clifton | July 27, 1937 |
| 2,017,265 | Tracy | Oct. 15, 1935 |

FOREIGN PATENTS

| Number | Country | Date |
|---|---|---|
| 446,405 | Great Britain | Apr. 29, 1936 |